(12) United States Patent
Lysen

(10) Patent No.: US 9,453,760 B2
(45) Date of Patent: Sep. 27, 2016

(54) DEVICE AND METHOD FOR EVALUATION OF VIBRATIONS

(71) Applicant: Pruftechnik Dieter Busch AG, Ismaning (DE)

(72) Inventor: Heinrich Lysen, Garching (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 389 days.

(21) Appl. No.: 13/971,961

(22) Filed: Aug. 21, 2013

(65) Prior Publication Data
US 2014/0090472 A1 Apr. 3, 2014

(30) Foreign Application Priority Data
Oct. 2, 2012 (DE) ......................... 10 2012 109 393

(51) Int. Cl.
*G01H 1/12* (2006.01)
*G01H 1/00* (2006.01)
*F03D 7/02* (2006.01)

(52) U.S. Cl.
CPC .............. *G01H 1/12* (2013.01); *F03D 7/0296* (2013.01); *G01H 1/003* (2013.01); *Y02E 10/723* (2013.01)

(58) Field of Classification Search
CPC ...... G01H 1/003; G01H 1/12; F03D 7/0296; Y02E 10/723
USPC .......................................................... 73/587
See application file for complete search history.

(56) References Cited

U.S. PATENT DOCUMENTS

| | | | | |
|---|---|---|---|---|
| 5,646,350 | A * | 7/1997 | Robinson ............ | G01M 13/028 73/599 |
| 5,876,265 | A * | 3/1999 | Kojima ................. | B24B 37/013 438/691 |
| 5,904,609 | A * | 5/1999 | Fukuroda .............. | B24B 37/005 451/285 |
| 6,408,079 | B1 * | 6/2002 | Katayama ............. | H03G 5/005 381/96 |
| 6,839,660 | B2 * | 1/2005 | Eryurek ............. | G05B 23/0262 702/188 |

(Continued)

FOREIGN PATENT DOCUMENTS

| | | |
|---|---|---|
| DE | 102010009941 A1 | 9/2011 |
| EP | 1612458 A2 | 1/2006 |
| FI | 954151 A | 3/1997 |

OTHER PUBLICATIONS

Loverro, A., "Fractional Calculus: History, Definitions and Applications for the Engineer", Dept. of Aerospace and Mechanical Engineering, University of Notre Dame, Notre Dame, IN 46556, USA, May 8, 2004, pp. 1-28.

*Primary Examiner* — J M Saint Surin
(74) *Attorney, Agent, or Firm* — Barlow, Josephs & Holmes, Ltd.

(57) ABSTRACT

A device for the evaluation of vibrations (10) comprises an evaluating device (12), which comprises an input for introducing a vibration signal (SG) and is designed to determine a characteristic signal (BK) with the dimension of length/time$^\beta$ and/or the square (SE) of the characteristic signal (BK) from the vibration signal (SG) by means of a frequency-dependent evaluation of the vibration signal (SG). For a predefined value of a dimensional exponent $\beta$, $1.3<\beta<1.7$, a vibration sensor (11) of the device (10) outputs the vibration signal (SG). An RMS value (BEF) of the characteristic signal (BK) or the square (SE) of the characteristic signal (BK) essentially corresponds to the damaging effect of the vibrations on a structure or a machine. The square (SE) can be converted into a service life (T) according to the equation T=KB/SE and displayed.

14 Claims, 5 Drawing Sheets

(56) References Cited

U.S. PATENT DOCUMENTS

| | | |
|---|---|---|
| 8,033,788 B2 | 10/2011 | Egedal et al. |
| 8,082,115 B2 | 12/2011 | Bechhoefer et al. |
| 2010/0332272 A1 | 12/2010 | Ong et al. |
| 2012/0051888 A1 | 3/2012 | Mizoue et al. |

\* cited by examiner

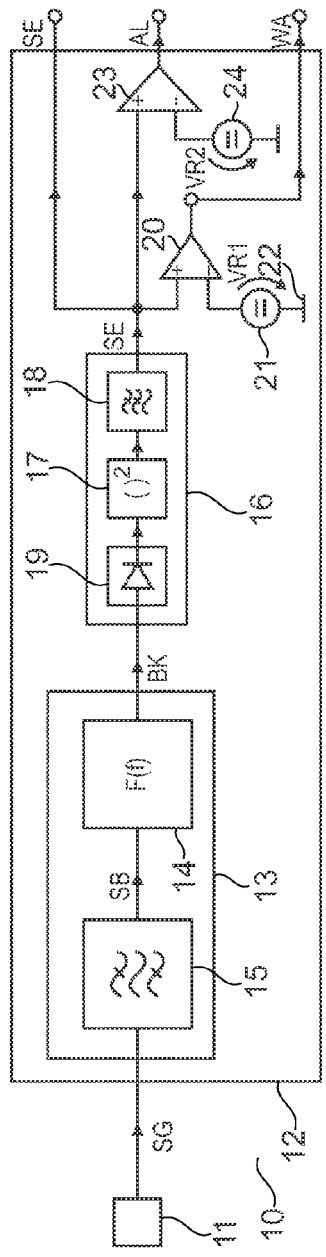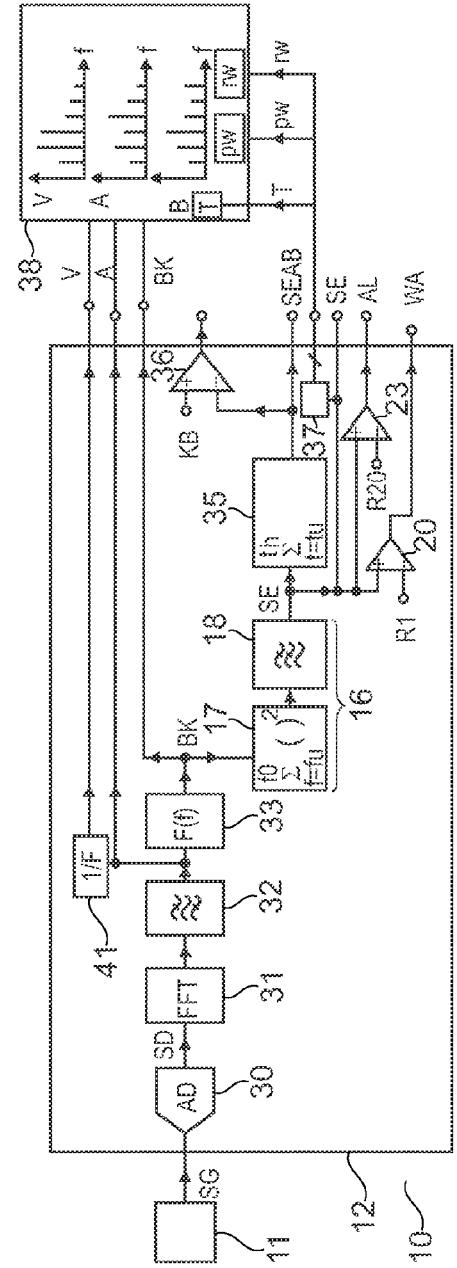
Fig. 1A
Fig. 1B

DEVICE AND METHOD FOR EVALUATION OF VIBRATIONS

BACKGROUND OF THE INVENTION

The invention relates to a device for the evaluation of vibrations and a method for the evaluation of vibrations.

The vibrations are mechanical vibrations, for example, of a machine or a system. In wind energy systems or wind turbines, vibrations are measured by means of vibration sensors. A determined acceleration is usually compared with an acceleration reference value and a determined velocity with a velocity reference value.

Document DE 102010009941 A1 describes a method for the monitoring of wind turbines. In this case, vibrations of a rotor blade are measured with an acceleration sensor and the measurement values are filtered with a low-pass filter.

SUMMARY OF THE INVENTION

An object of the present invention is to provide a device for the evaluation of vibrations and a method for the evaluation of vibrations in which a signal that is different from an acceleration or a velocity is generated.

The object is achieved with the subject according to claim 1 as well as the method with the features according to claim 14. Enhancements and embodiments are the subject of the dependent claims.

In one embodiment, a device for the evaluation of vibrations comprises an evaluating device that comprises an input for introducing a vibration signal. The evaluating device is designed to determine a characteristic signal with the dimension of length/time$^\beta$ and/or a square of the characteristic signal from the vibration signal by means of a frequency-dependent evaluation of the vibration signal, $\beta$ being $1.3<\beta<1.7$ for a predefined value of a dimensional exponent.

The characteristic signal advantageously has a dimension that is different than a velocity or an acceleration. The characteristic signal is preferably an intermediate between an acceleration and a velocity at the site of a vibration sensor. The vibration sensor of the device outputs the vibration signal to the input of the evaluating device. To provide the characteristic signal, the vibration signal is converted to the dimension of length/time$^\beta$. To provide the square of the characteristic signal, the vibration signal is converted to the dimension of length$^2$/time$^{2\beta}$.

In one embodiment, the evaluating device determines the characteristic signal and does not determine the square of the characteristic signal.

In an alternative embodiment, the evaluating device determines the characteristic signal and the square of the characteristic signal. For this purpose, for example, the evaluating device can determine the characteristic signal and subsequently the square of the characteristic signal by squaring the characteristic signal. Alternatively, the evaluating device can determine the square of the characteristic signal by squaring the characteristic signal and subsequent averaging.

In another alternative embodiment, the evaluating device determines the square of the characteristic signal without determining the characteristic signal. For this purpose, for example, the evaluating device can decompose the vibration signal by means of Fourier transform into signal components occurring at different frequencies, square the signal components, and subsequently weight them and sum them dependent on frequency. The sum of the squared and weighted signal components corresponds to the square of the characteristic signal. The evaluating device optionally carries out an averaging after the summing.

The evaluating device preferably determines the characteristic signal and/or the square of the characteristic signal on-line.

In one embodiment, the characteristic signal has m/s$^\beta$ as units, with $1.3<\beta<1.7$. The characteristic signal preferably has units of m/s$^{3/2}$. Thus, the characteristic signal lies intermediate between a velocity signal with the units of m/s and an acceleration signal with the units of m/s$^2$. Instead of meters for the units, inches, feet or miles may also be used. Instead of seconds for the units, minutes or hours may also be used.

In one embodiment, the vibration sensor emits the vibration signal with the dimension of length/time$^\beta$ with $1.3<\beta<1.7$. The evaluating device provides the characteristic signal by means of band limitation of the vibration signal to a predefined frequency range.

In an alternative embodiment, the vibration sensor emits the vibration signal with a dimension that is different than the dimension of length/time$^\beta$ with $1.3<\beta<1.7$. The evaluating device provides the characteristic signal with the dimension of length/time$^\beta$ with $1.3<\beta<1.7$ by means of band limitation to a predefined frequency range and frequency-dependent evaluation. This is conducted, for example, for a vibration signal representing an acceleration or a velocity.

In one embodiment, the evaluating device provides an effective value (RMS value) for the characteristic signal. The evaluating device determines the RMS value of the characteristic signal by taking the square root of the square of the characteristic signal. Thus the square of the characteristic signal can also be called the square of the RMS value of the characteristic signal. The RMS value and the square of the characteristic signal make possible an evaluation of the current operating state of a system or a machine. The RMS value and the square of the characteristic signal essentially correspond to the damaging effect of vibrations on a structure and a machine. The square of the characteristic signal is equal to a specific vibration power in W/kg.

In one embodiment, the evaluating device converts the square of the characteristic signal into a service life T according to the equation T=KB/SE, KB being a run time constant. The run time constant, for example, is equal to the square of the sound velocity of steel. The device for evaluating vibrations comprises a display that indicates the service life. The structure or the machine only withstands the damaging effect of the square SE of the characteristic signal for the service life T. This conversion carried out on-line brings about an understandable representation of the square of the characteristic signal. The service life serves for the quality estimate of the machine. If the square of the characteristic signal were constant, then the service life would be equal to the expected operating time for the machine.

In one embodiment, a device for the evaluation of vibrations comprises a vibration sensor for the output of a vibration signal and an evaluating device that is coupled on the input side to the vibration sensor. The evaluating device is designed to determine a characteristic signal from the signal components of the vibration signal lying within a predefined frequency range employing a weighting, the weighting of the signal components of the vibration signal having increasing frequency either increasing in the predefined frequency range or decreasing in the predefined frequency range.

The vibration signal preferably has signal components lying at different frequencies. The characteristic signal also has signal components lying at different frequencies. The vibration signal and the characteristic signal are thus dependent on frequency. The signal components of the vibration signal lying at different frequencies are advantageously evaluated by a weighting dependent on frequency, so that signal components with frequencies that have a large effect on a system, i.e., the system has a high load, are considered to be stronger than other signal components. Either signal components lying at low frequencies in the predefined frequency range are weighted more than signal components lying at high frequencies, or signal components lying at low frequencies in the predefined frequency range are weighted less than signal components lying at high frequencies. The weighting is a continually increasing or decreasing function in the predefined frequency range.

In one embodiment, the evaluating device determines the characteristic signal by means of fractional derivation or fractional integration of the vibration signal. For this purpose, for example, the evaluating device uses a filter arrangement, a Fourier transform or an equalizer. According to the field of fractional calculus, fractional derivatives and integrals can be defined according to Riemann-Liouville and Grünwald-Letnikov. The characteristic signal is not determined by integer derivation or integration of the vibration signal.

In one embodiment, the evaluating device provides the RMS value or the square of the characteristic signal without consideration of signal components of the characteristic signal that lie outside the predefined frequency range. The RMS value and the square of the characteristic signal serve for a frequency-independent damage evaluation.

In an alternative embodiment, the evaluating device strongly attenuates the signal components of the vibration signal lying outside the predefined frequency range when providing the characteristic signal. The evaluating device may have a low-pass filter or a bandpass filter for reducing signal components that lie outside the predefined frequency range. The predefined frequency range is thus the range from 0 Hz up to the limit frequency of the low-pass filter or the pass band of the bandpass filter.

In one embodiment, the evaluating device integrates the value for the square of the characteristic signal over time or sums the values for the square and determines an energy value signal from the result of the integration or summation. The energy value signal represents an effective elapsed operating run time. The square of the characteristic signal corresponds to a power which the vibrations take in a system. The integration by means of the square of the characteristic signal thus yields the amount of energy to which the system has been subjected based on the vibrations. The energy value signal represents the fatigue of the system that has occurred in previous operation. The evaluating device records the value of the characteristic signal as well as the run time during which the system is operated with this value of the characteristic signal. The energy value signal can be compared with the value that is expected at the end of the run time of the system. Thus, the evaluating device can provide information of when the time point of anticipated failure will occur with a continuation of loading by means of the characteristic signal. The evaluating device calculates a remaining run time. The remaining run time is an expected value for the remaining useful run time of the system. The remaining run time is equal to an expected value for the operating time minus the energy value signal. The device for the evaluation of vibrations can thus supply information similar to a component Wöhler test. The effective elapsed operating run time is advantageously determined on-line and continuously or almost continuously from the vibration signal measured during the operation.

In one embodiment, a vibration generates the vibration signal of the vibration sensor in one measurement direction. A vibration in at least one other measurement direction, which is different from the measurement direction, generates at least one further vibration signal, which is output by the vibration sensor. The vibration sensor may comprise a sensor element for outputting the vibration signal and at least one further sensor element for outputting the at least one further vibration signal. The evaluating device provides at least one further characteristic signal from the at least one further vibration signal. The evaluating device determines the square of the characteristic signal of the vibration signal and the square of the characteristic signal of the at least one further vibration signal and sums up the squares. The energy value signal corresponds to the time integral over the sum of the squares of the characteristic signals.

In one embodiment, the vibration sensor detects vibrations in a first frequency range. The device for the evaluation of vibrations may comprise a further vibration sensor that detects vibrations in a second frequency range. The first and the second frequency ranges may be different. For example, the first frequency range may comprise low frequencies and the second frequency range may comprise high frequencies. The characteristic signal can be provided as a function of the vibration signal of the vibration sensor and of the vibration signal of the further vibration sensor, for example, by adding up the signals.

In an enhancement, a wind turbine comprises the device for the evaluation of vibrations, a tower, a rotor, a gear, a bearing, and a generator. The vibration sensor is coupled to at least one component from the group comprising the tower, the rotor, the gear, the bearing and the generator.

The device for the evaluation of vibrations can be attached permanently to the machine or system as a solidly installed arrangement. Alternatively, the device for the evaluation of vibrations can be embodied as a manual instrument.

In one embodiment, a method for the evaluation of vibrations comprises a determination of a characteristic signal that has the dimension of length/time$^\beta$ with a dimensional exponent $\beta$ from a range of $1.3<\beta<1.7$, and/or a determination of a square of the characteristic signal via an evaluating device by means of a frequency-dependent evaluation of a vibration signal, which is output by a vibration sensor.

An output of a characteristic signal advantageously occurs with a dimension between the dimension of length/time of a velocity and the dimension of length/time$^2$ of an acceleration.

BRIEF DESCRIPTION OF THE DRAWINGS

The invention will be explained in more detail below for several examples of embodiment based on the figures. Components or functional blocks with the same function or action have the same reference numbers. Insofar as components or functional blocks correspond in their function, their description will not be repeated in any of the following figures, herein:

FIGS. 1A to 1C show exemplary embodiments of a device for the evaluation of vibrations;

DETAILED DESCRIPTION OF THE INVENTION

Figure 1C:
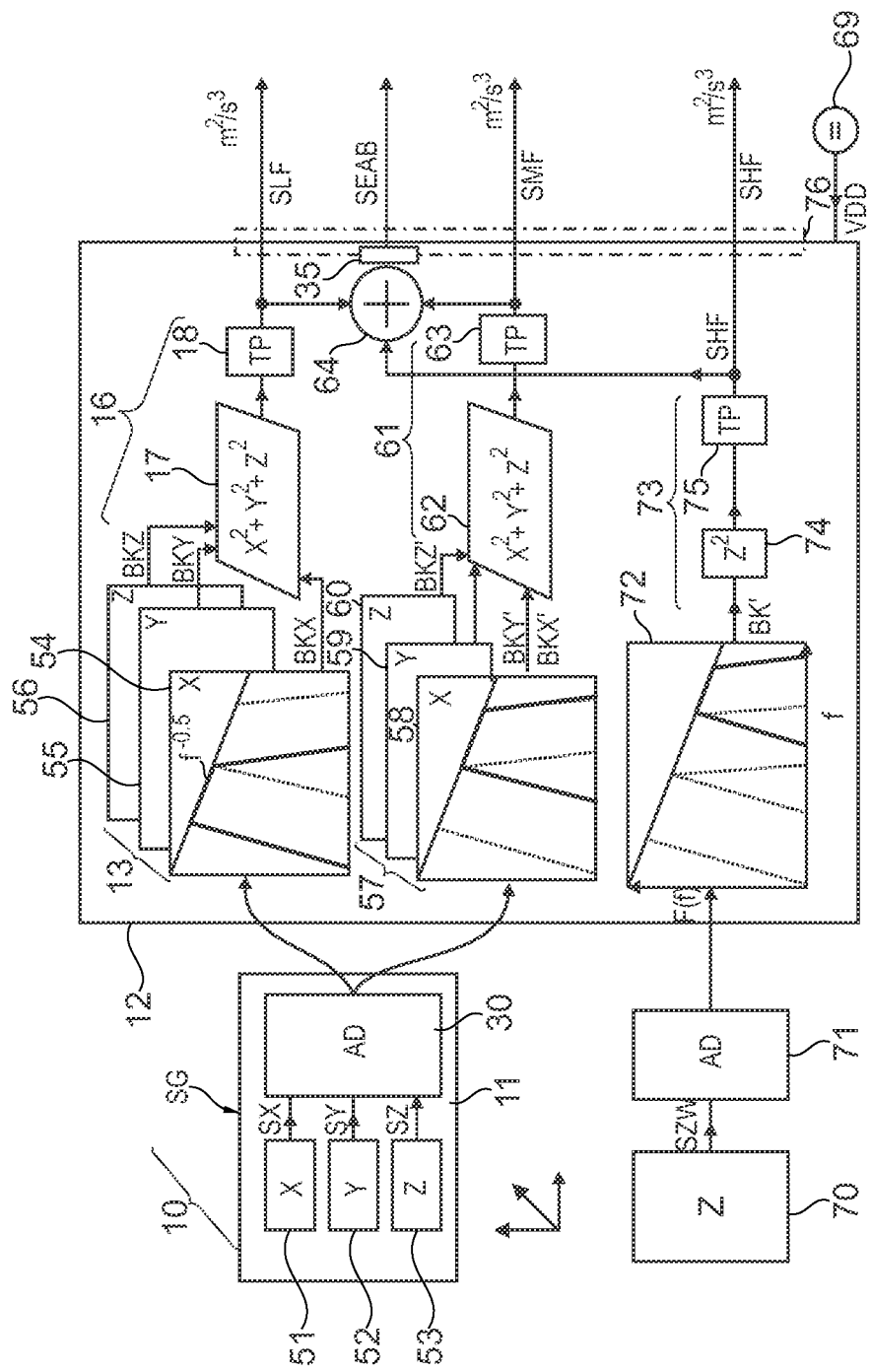

FIG. 1A shows an exemplary embodiment of a device for the evaluation of vibrations 10. The device for the evaluation of vibrations 10 comprises a vibration sensor 11 and an evaluating device 12. An output of the vibration sensor 11 is coupled to an input of the evaluating device 12. The evaluating device 12 comprises a filter arrangement 13, which is coupled to the vibration sensor on the input side 11. The filter arrangement 13 has a filter 14 and a bandpass filter 15. The vibration sensor 11 is coupled to the filter 14 via the bandpass filter 15. In addition, the evaluating device 12 comprises a squaring device 16. An input of the squaring device 16 is connected to an output of the filter arrangement 13. The squaring device 16 comprises a squaring unit 17, which is coupled to the output of the filter arrangement 13, and an averaging unit 18, which is connected downstream to the squaring unit 17. The squaring device 16 additionally comprises an absolute value-forming unit 19, which couples the squaring unit 17 to the output of the filter arrangement 13.

The evaluating device 12 further comprises a first and a second comparator 20, 23, each of which is connected at a first input to an output of the squaring device 16. A second input of the first comparator 20 is coupled to a reference potential connection 22 via a warning reference voltage source 21, and a second input of the second comparator 23 is coupled to the reference potential connection 22 via an alarm reference voltage source 24.

The vibration sensor 11 is provided as a piezoelectric acceleration sensor. The vibration sensor 11 has a vibration recorder, which is not depicted, and an amplifier connected downstream. Alternatively, the vibration sensor 11 is formed as a micromechanical acceleration sensor, also frequently as an acceleration sensor for a micro-electromechanical system, abbreviated MEMS acceleration sensor. The vibration sensor 11 outputs a vibration signal SG. The vibration sensor 11 measures the displacement of a component of a rotating machine on the component and thus measures the mechanical vibrations of the component. The vibration sensor 11 can be fastened, e.g., on a bearing of a rotating machine. The vibration signal SG is an acceleration signal and corresponds to a value for the acceleration of the component or an element. The vibration signal SG has the dimension of length/time².

The vibration signal SG is thus introduced into the evaluating device 12 and thus into the filter arrangement 13. The filter arrangement 13 generates a characteristic signal BK through filters of the vibration signal SG according to a transfer function F(f). The bandpass filter 15 filters the vibration signal SG and thus provides a bandpass-filtered vibration signal SB to the filter 14. The filter 14 generates the characteristic signal BK from the bandpass-filtered vibration signal SB. The filter 14 possesses the following transfer function F(f):

$$F(f) = \frac{B(f)}{S(f)} = K \cdot f^\alpha$$
with
$$-1 < \alpha < 0,$$

wherein f is a frequency, K is a predefined value of a constant and α is a predefined value of an exponent. In this case, K may possess a real portion and/or an imaginary portion. K may have units such as $s^\alpha$. K is not equal to 0. The transfer function F(f) represents a filter characteristic of the filter 14. In an alternative embodiment, the filter 14 has a transfer function F(f) whose absolute value |F(f)| corresponds to the following equation:

$$|F(f)| = \left|\frac{BK}{SG}\right| = K \cdot f^\alpha$$
with
$$-1 < \alpha < 0,$$

wherein K has exclusively a real portion. The transfer function F(f) may thus have a real portion and an imaginary portion. Preferably, $-0.7 < \alpha < -0.3$. More preferably $\alpha = -\frac{1}{2}$. The absolute value |SG| of the frequency-dependent vibration signal SG is consequently multiplied by $K \cdot f^\alpha$ in order to obtain the absolute value |BK| of the frequency-dependent characteristic signal BK. Since α is not equal to 0, the ratio of the absolute value of the characteristic signal to the absolute value of the vibration signal is frequency-dependent. The characteristic signal BK thus contains signal components exclusively at frequencies within the pass band predefined by the bandpass filter 15. In the characteristic signal BK, signal components for the different frequencies f are weighted according to the frequency-dependent transfer function F(f). The characteristic signal BK then has the dimension of length/time$^\beta$, whereby for a predefined value of a dimensional exponent β, $1.3 < \beta < 1.7$. Thus, $\beta = 2 + \alpha$.

The characteristic signal BK is introduced into the squaring device. The absolute value-forming device 19 is embodied as a rectifier. The rectifier may be a one-way, two-way or four-way rectifier. The absolute value-forming device 19 thus outputs a signal that corresponds to the rectified characteristic signal. The rectified characteristic signal is squared by the squaring unit 17. The averaging device 18 averages the signal provided by the squaring unit 17 and in this case removes higher frequency components in the signal provided by the squaring unit 17. The averaging unit 18 achieves an averaging over a time span of 10 minutes, for example. The averaging unit 18 can be embodied as a low-pass filter. A square SE of the RMS value BEF of the characteristic signal BK, or abbreviated, the square SE of the characteristic signal BK, can be tapped at the output of the squaring device 16. The square SE of the characteristic signal BK is thus determined by forming the absolute value from the characteristic signal BK, squaring and averaging. The averaging is produced by low-pass filters. The squaring device 16 conducts an energy-equivalent averaging of the characteristic signal BK.

The square SE of the characteristic signal BK is supplied to the first and second comparators 20, 23. The first comparator 20 outputs a warning signal WA if the square SE of the characteristic signal BK is greater than a warning reference voltage VR1 provided by the first reference voltage source 21. The second comparator 23 generates an alarm signal AL as a function of a comparison of the square SE of the characteristic signal BK with an alarm reference voltage VR2 output by the second reference voltage source 24. The value of the alarm reference voltage VR2 is greater than the warning reference voltage VR1. The device for the evaluation of vibrations 10 thus determines information on the state of the component, the element, the machine or the system, and monitors the component, the element, the machine or the system. The evaluating device 12 with analog technology is provided. The warning and the alarm signals WA, AL advantageously are determined without simultaneous observation of an acceleration signal A and a velocity signal V.

In an alternative embodiment, which is not shown, the bandpass filter 15 is connected downstream to the filter 14 or the filter 14 and the bandpass filter 15 are integrated into one circuit.

In an alternative embodiment, which is not shown, a device for taking the square root is connected downstream to the squaring device 16 and this device outputs the RMS value BEF of the characteristic signal BK.

In an alternative embodiment, the vibration sensor has a frequency path. The transfer function F(f) is then provided so that the characteristic signal BK has the dimension of length/time$^\beta$ with $1.3<\beta<1.7$.

In an alternative embodiment, the vibration signal SG corresponds to a velocity of the component or of the element to which the vibration sensor 11 is attached. Here the following applies: $0.3<\alpha<0.7$. Preferably, $\alpha=\frac{1}{2}$. The vibration signal SG representing a velocity has the dimension of length/time. The characteristic signal BK has the dimension of length/time$^\beta$ with $1.3<\beta<1.7$, so that $\beta=1+\alpha$.

In an alternative embodiment, the vibration sensor 11 is provided as a path, site, length or angle sensor. The vibration signal SG thus corresponds to a path, site, length or angle input of the component or of the element to which the vibration sensor 11 is attached. The vibration sensor 11 can be embodied as a strain gauge that provides a site or length input. Alternatively, the vibration sensor 11 can be implemented as a Hall sensor that outputs an angle input of a rotating system component as a vibration signal SG. Here the following applies: $1.3<\alpha<1.7$. Preferably: $\alpha=3/2$. Here, the vibration signal SG has the dimension of length. The characteristic signal BK has the dimension of length/time$^\beta$ with $1.3<\beta<1.7$, so that $\beta=\alpha$.

FIG. 1B shows an alternative exemplary embodiment of the device for the evaluation of vibrations 10, which is an enhancement of the embodiment shown in FIG. 1A. The evaluating device 12 has an analog-digital converter 30, abbreviated AD converter, which is coupled on the input side to the vibration sensor 11. The evaluating device 12 comprises digital circuits. The evaluating device 12 comprises a device 31 for Fourier transform, a device 32 for bandpass filtering and a device 33 for weighting according to the transfer function F(f). The AD converter 30 is coupled on the output side to the device 33 for weighting according to the transfer function F(f) via the device 31 for Fourier transform and the device 32 for bandpass filtering. The squaring device 16 is connected downstream to the device 33 for weighting according to the transfer function F(f). An output of the squaring device 16 is connected to the first and to the second comparators 20, 23.

An energy value summing unit 35 of the evaluating device 12 is connected to the output of the squaring device 16. A comparator 36 is connected to an output of the energy value summing unit 35. The device for the evaluation of vibrations 10 additionally comprises a display 38, which is coupled on the input side to an output of the device 33 for weighting according to the transfer function. Further, the display 38 is connected to the output of the device 32 for the bandpass filtering. The evaluating device 12 further comprises an integrator 41, which couples the output of the device 32 for bandpass filtering to the display 38.

The vibration signal SG is converted into a digitized vibration signal SD by the AD converter 30. The digitized vibration signal SD is decomposed into signal components occurring at different frequencies by means of the device 31 for Fourier transform, whereby signals with frequencies outside a defined pass band are removed by means of the device 32 for bandpass filtering. The Fourier transform is carried out by means of the method for the Fast Fourier transform, abbreviated FFT. The device 33 for weighting according to the transfer function F(f) weights the signal components of the vibration signal SG for the different frequencies f by multiplication of the amplitudes by the value of the transfer function F(f) at the respective frequency f. The characteristic signal BK stands ready at the output of the device 33 for weighting according to the transfer function.

The characteristic signal BK is supplied to the display 38. The display 38 displays the characteristic signal BK in a frequency-dependent manner. The display 38 shows the characteristic signal BK in the form of a frequency spectrum. The spectrum contains the information on frequencies at which signal components are present in the characteristic signal BK, and the level of the signal components. The acceleration signal A, which is obtained by Fourier transform and bandpass filtering from the vibration signal SG, can be tapped at the output of the device 32 for bandpass filtering. The velocity signal V, which was generated from the bandpass-filtered and Fourier-transformed vibration signal SG by multiplication by 1/f is ready at the output of the integrator 41. The display 38 thus additionally shows the frequency spectra of the acceleration signal A and the velocity signal V. Based on the transfer function F(f), a dynamic range of the characteristic signal BK is smaller than a dynamic range of the velocity or of the acceleration signals V, A. The characteristic signal may also be called the "vibrancy" signal.

The squaring device 16 generates the square of the RMS value SE of the characteristic signal BK by squaring the signal components of the characteristic signal BK and subsequently summing the squares of the signal components. The square of the RMS value SE is compared to a predefined warning reference value R1 by the first comparator 20 and to a predefined alarm reference value R2 by the second comparator 23. The first comparator 20 outputs the warning signal WA. The second comparator 23 provides the alarm signal AL.

The energy value summing unit 35 sums up the values for the square of the RMS value SE. This summation takes place at regular time intervals. The energy value summing unit 35 outputs an energy value signal SEAB. The energy value summing unit 35 may have an accumulator. The accumulator of the energy value summing unit 35 is set to zero at the start for the system to be monitored. The value of the accumulator is increased by the value of the square of the RMS value SE at regular predefined time intervals. In order to determine the effective elapsed run time, the summation and integration for the square of the RMS value SE for the characteristic signal BK typically take place over long time spans, e.g., such as one year.

After integration over time to the time point of the end of a run time for a system, the square of the RMS value SE of the characteristic signal BK is equal to a run time constant KB. If the energy value signal SEAB reaches the value of the run time constant KB, the end of the expected run time is thus also reached. The run time constant KB, for example, can be the square of the sound velocity in the material of the system or of the component. A processing unit 37 of the evaluating device 12 converts the square of the RMS value SE into a service life T according to the equation T=KB/SE. The display 38 indicates the service life T.

The processing unit 37 calculates on-line a vibration power pw by multiplication of the square SE of the characteristic signal BK by a mass of a machine, the vibrations of which represent the vibration signal SG. The display 38 indicates the vibration power pw. Further, the processing unit 37 calculates on-line a vibration rate rw by dividing the vibration power pw by a machine power. For example, the machine power is the electric power currently supplied to the machine or output by a generator. The display 38 indicates the vibration rate rw.

The comparator 36 compares the energy value signal SEAB with the run time constant KB and outputs a signal that displays how soon the end of the expected run time will be reached. The energy value signal SEAB is calculated from:

$$SEAB = \int_{t=0}^{RT} BK^2 \cdot dt = \int_{t=0}^{RT} SE \cdot dt,$$

wherein RT is the previous run time.

In an alternative embodiment, which is not shown, the RMS value BEF of the characteristic signal is determined by taking the root of the square SE of the characteristic signal BK. Instead of the square SE, the RMS value BEF may also be compared with predefined warning or alarm reference values R1, R2.

In an alternative embodiment, which is not shown, the vibration signal SG can be down-sampled successively by the factor 2, subsequently filtered by means of a low-pass filter, and subsequently be put together again. With successive decimation to half the sample frequency each time, a complex octave filtering and a forming of the absolute value of the vibrancy square result.

FIG. 1C shows another exemplary embodiment of the device for the evaluation of vibrations 10, which is an enhancement of the embodiments shown in FIGS. 1A and 1B. The vibration sensor 11 comprises a first, a second, and a third sensor element 51, 52, 53, which are sensitive to vibrations in different spatial directions. Thus, the first sensor element 51 outputs a first vibration signal SX, which represents vibrations in the X direction. Correspondingly, the second and the third sensor elements 52, 53 output a second and a third vibration signal SY, SZ, which represent vibrations in the Y or Z direction. The vibration sensor 11 comprises the AD converter 30, which is connected on the input side to the first, second and third sensor elements 51 to 53. The filter arrangement 13 is connected downstream to the AD converter 30 and is formed as a digital filter. The digital filter is embodied as a finite impulse response filter, abbreviated FIR filter, or as an infinite impulse response filter, abbreviated IIR filter. The filter arrangement 13 can be called an edgewise vibration filter. The filter arrangement 13 carries out the bandpass filtering and the filtering according to the transfer function F(f). The filter arrangement 13 has a first, a second, and a third filter arrangement 54 to 56. The first filter arrangement 54 is connected on the input side to the first sensor element 51 via the AD converter 30. Correspondingly, the second and the third filter arrangement 55, 56 are connected to the second and the third sensor elements 52, 53 via the AD converter 30. The first, second and third filter arrangements 54 to 56 conduct a bandpass filtering and a weighting according to the transfer function F(f) of the digitized values of the first, second and third vibration signals SX, SY, SZ that are provided by the AD converter 30.

The squaring device 16, which comprises the squaring unit 17, is disposed downstream of the filter arrangement 13. The squaring unit 17 calculates the squares of a first, a second and a third characteristic signal BKX, BKY, BKZ, which are found on the output side of the first, second and third filter arrangements 54 to 56, and sums up the squares. The averaging device 18 is connected downstream to the squaring unit 17. The averaging device 18 can be embodied as a low-pass filter. The sum SLF of the squares of the three characteristic signals BKX, BKY, BKZ in the three spatial directions X, Y and Z is ready at the output of the evaluating device 12. The sum SLF of the squares of the three characteristic signals BKX, BKY, BKZ can represent a vibration of a building, of a substructure or of a structure. In this case, signals in a low-frequency range are transmitted exclusively by the filter arrangement 13. For example, the frequency range lies between 0.05 Hz and 10 Hz.

In addition, the evaluating device 12 comprises a further filter arrangement 57, which has further first, second and third filter arrangements 58 to 60, which are coupled on the input side to the first, second and third sensor elements 51 to 53 via the AD converter 30. The further filter arrangement 57 carries out a filtering of the first, second and third vibration signals SX, SY, SZ according to another transfer function F'(f). In this case, signal components that lie in another predefined frequency range are transmitted. The frequency range of the signal components to be transmitted in the further filter arrangement 57 is shifted to higher frequencies when compared to filter arrangement 13.

Further, the evaluating device 12 comprises another squaring device 61, which squares and adds up the first, second and third further characteristic signals BKX', BKY', BKZ' provided by the further first, second and third filter arrangements 58 to 60 by means of a further squaring unit 62. A further averaging unit 63 is connected downstream to the squaring unit 62. Thus, a further signal SMF that represents the sum of the squares of the first, second and third further characteristic signals BKX', BKY', BKZ' of the further filter arrangement 57 is found at the output of the further squaring device 61. The further sum SMF of the squares of the three further characteristic signals BKX', BKY', BKZ' can be caused by a machine vibration, an imbalance or an error in the alignment of shafts, such as, e.g., the shaft of the generator to the shaft of the rotor. The transmission region, for example, lies at values between 10 Hz and 1 kHz. The squaring device 16 and the further squaring device 61 are connected to two inputs of an adding unit 64. The energy value summing unit 35, which is embodied as an integrator, is connected downstream to the adding unit 64. The energy value summing unit 35 calculates the energy value signal SEAB. The evaluating device 12 has an interface 76, such as, e.g., a 4 to 20 mA interface with Hart protocol or a Profibus interface. The device for the evaluation of vibrations 10 is supplied by a power supply 69. For example, the power supply 69 provides a supply voltage VDD of 5 V.

In addition, the device for the evaluation of vibrations 10 comprises an additional vibration sensor 70. The additional vibration sensor 70 provides an additional vibration signal SZW. The additional vibration sensor 70 detects vibrations in one direction, for example, in the Z direction. The additional vibration signal SZW is digitized by means of an additional AD converter 71 and transformed into an additional characteristic signal BK' by an additional filter arrangement 72. The additional characteristic signal BK' is generated from the digitized vibration signal SZW by means of the above-indicated transfer function F(f). Also, the additional characteristic signal BK' is free of signal components with frequencies outside a pass band predefined by the additional filter arrangement 72. For example, the additional filter arrangement 72 has a pass band between 1 kHz and 20 kHz. Thus, the additional characteristic signal BK' primarily shows shock pulses as they occur, e.g., in the case of bearing and gear damage. An additional squaring device 73 squares the additional characteristic signal BK'. High frequencies in the output signal of an additional squaring unit 74 are removed by an additional averaging device 75. Thus the square SHF of the additional characteristic signal BK' is ready at the output of the additional averaging device 75.

The square SHF of the additional characteristic signal BK' is introduced into a further input of the adding unit 64. Thus the energy value signal SEAB is determined from the vibration signals SG, SZW of the vibration sensor 11 and of the additional vibration sensor 70. The vibration signals that are recorded for the three measurement directions X, Y and Z are squared and added by the evaluating device 12 after the frequency evaluation. Advantageously, the number of necessary monitoring channels and lines is reduced thereby. The device for the evaluation of vibrations 10 has a monitoring mode and a diagnosis mode. In the monitoring mode, the device for the evaluation of vibrations 10 provides an envelope curve over the measurement directions X, Y, Z and the predefined frequency ranges. Further, in the diagnosis mode, the device for the evaluation of vibrations 10 provides information on the acceleration in the selected axes X, Y, Z. The device for the evaluation of vibrations 10 may have a service mode, in which a self-test, a calibration and a parameterization are conducted.

The evaluating device 12 is implemented as a microprocessor, microcontroller, digital signal processor, logic circuit or field programmable gate array, abbreviated FPGA. The filter arrangements 13, 57, 72 and the squaring devices 16, 61, 73 are provided by means of a software program or logic gates. The evaluating device 12 processes the vibration signals SG, SZW on-line and provides the signals SHF, SMF, SLF on-line. The vibration sensor 11 is embodied as a MEMS acceleration recorder. The additional vibration sensor 70 is designed as a piezo acceleration recorder. The device for the evaluation of vibrations 10 advantageously comprises several vibration sensors 11, 70, which cover different frequency ranges of the vibrations, in order to detect vibrations over a large frequency range.

Figure 2A:
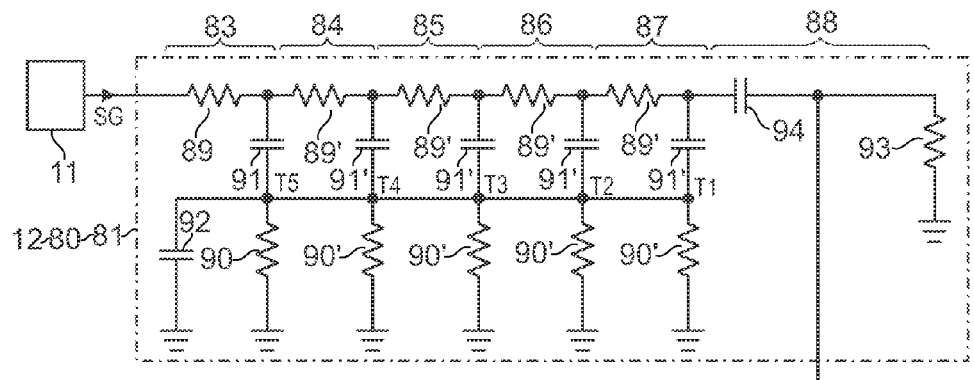
FIGS. 2A to 2C show another exemplary embodiment of a device for the evaluation of vibrations and signal curves belonging to it.

FIG. 2A shows another exemplary embodiment of the device for the evaluation of vibrations 10, which is an enhancement of the embodiments shown in FIGS. 1A to 1C. The evaluating device 12 comprises an equalizer 80. The equalizer 80 on the input side is coupled to the vibration sensor 11. The equalizer 80 has a frequency splitting unit 81. The frequency splitting unit 81 comprises a multiple number M of low-pass stages 83 to 87 as well as a high-pass filter 88. The multiple number M in the example is 5, but a smaller or a larger value may also be adopted. The multiple number M of low-pass stages 83 to 87 as well as the high-pass filter 88 are connected behind one another.

A first low-pass stage 83 of the multiple number M of low-pass stages has a first resistance 89, which connects an input of the first low-pass stage 83 to an output of the first low-pass stage 83. The output of the first low-pass stage 83 is connected to the reference potential connection 22 via a series circuit comprising a second resistance 90 and a first capacitor 91. In this case, the first capacitor 91 is connected to the output of the first low-pass stage 83 and the second resistance 90 is connected to the reference potential connection 22. A node between the first capacitor 91 and the second resistance 90 is coupled to the reference potential connection 22 via a second capacitor 92. A first signal T5 of the first stage 83 can be tapped at the node between the second resistance 90 and the first capacitor 91.

The second to the fifth low-pass stages 84 to 87, analogous to the first low-pass stage 83, each have a further first resistance 89' as well as a series circuit comprising a further second resistance 90' and a further first capacitor 91', which are disposed as in the first low-pass stage 83. The high-pass filter 88 has a series circuit composed of a high-pass capacitor 94 and a high-pass resistance 93, which couple the output of the fifth low-pass stage 87 to the reference potential connection 22. In this case the high-pass capacitor 94 is connected to the output of the last low-pass stage 87 and the high-pass resistance 93 is connected to the reference potential connection 22. A node between the high-pass capacitor 94 and the high-pass resistance 93 forms a signal output of the high-pass filter 88, at which the characteristic signal BK is found. The equalizer thus outputs the characteristic signal BK. The characteristic signal BK can be further processed analogous to the evaluating device 12 shown in FIG. 1A. For this purpose, the evaluating device 12 comprises the components shown in FIG. 1A.

The equalizer 80, also called the sound creation filter, carries out the band limitation, equilibrates a frequency response of the vibration sensor 11 and generates the characteristic signal BK from the vibration signal SG with the dimension of length/time$^\beta$ with $1.3<\beta<1.7$. The equalizer 80 decomposes the vibration signal SG into a first number of frequency bands. Further, the equalizer 80 weights the signal of a band by means of amplifying or attenuating the signal. Further, the weighted signals of the bands are combined into an output signal of the equalizer 80, the output signal corresponding to the characteristic signal BK. The mode of operation of the equalizer 80 will be explained in more detail based on FIG. 2B.

Figure 2B:
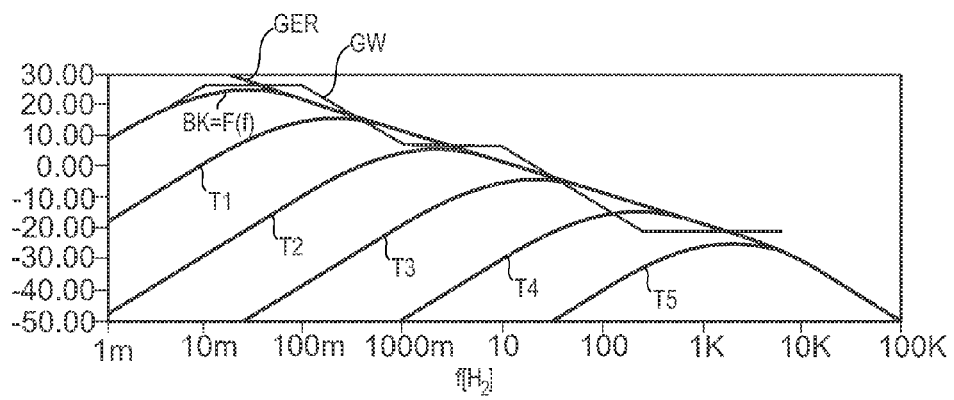

FIG. 2B shows exemplary characteristics of the equalizer 80, which is shown in FIG. 2A. The output signals T1 to T6 of each of the five low-pass stages 83 to 87 divided by the vibration signal SG are shown in FIG. 2B as a function of the frequency f. The frequency maximum of the first signal T5 is higher than the frequency maximum of the second signal T4, which is generated by means of the second low-pass stage 84. Thus, the second signal T4 has a higher value relative to the vibration signal SG than the first signal T5. In a corresponding way, the frequency maxima of the signals of the further stages with increasing number of stages are shifted to lower frequencies and the levels of the respective signals are shifted to higher values.

The transfer function F(f) between the characteristic signal BK and the vibration signal SG can be adjusted by the selection of the values for the resistances 90, 90', 93 and capacitors 91, 91', 92, 94. In addition, the transfer function F(f), a target straight line GER as well as exemplary limit values GW for the acceleration and the velocity are depicted in FIG. 2B. The characteristic signal BK normalized to the vibration signal SG is identical to the transfer function F(f). The limit values produce a stair-shaped function GW as a function of the frequency f.

Figure 2C:
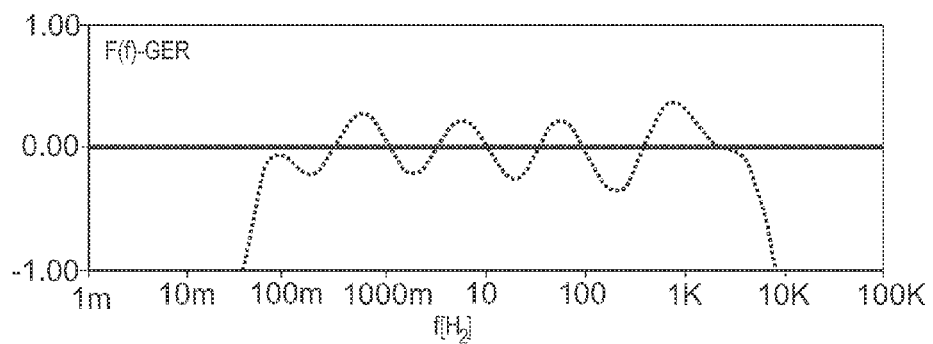

FIG. 2C shows a deviation of the transfer function F(f) from the straight line GER provided by means of the equalizer 80. The deviation is 2 to 3% in the pass band and is thus smaller than the usual accuracy of the vibration sensor 11.

In an alternative embodiment, which is not shown, the equalizer 80 comprises a microprocessor. The equalizer 80 is provided by means of a software program.

Figure 3A:
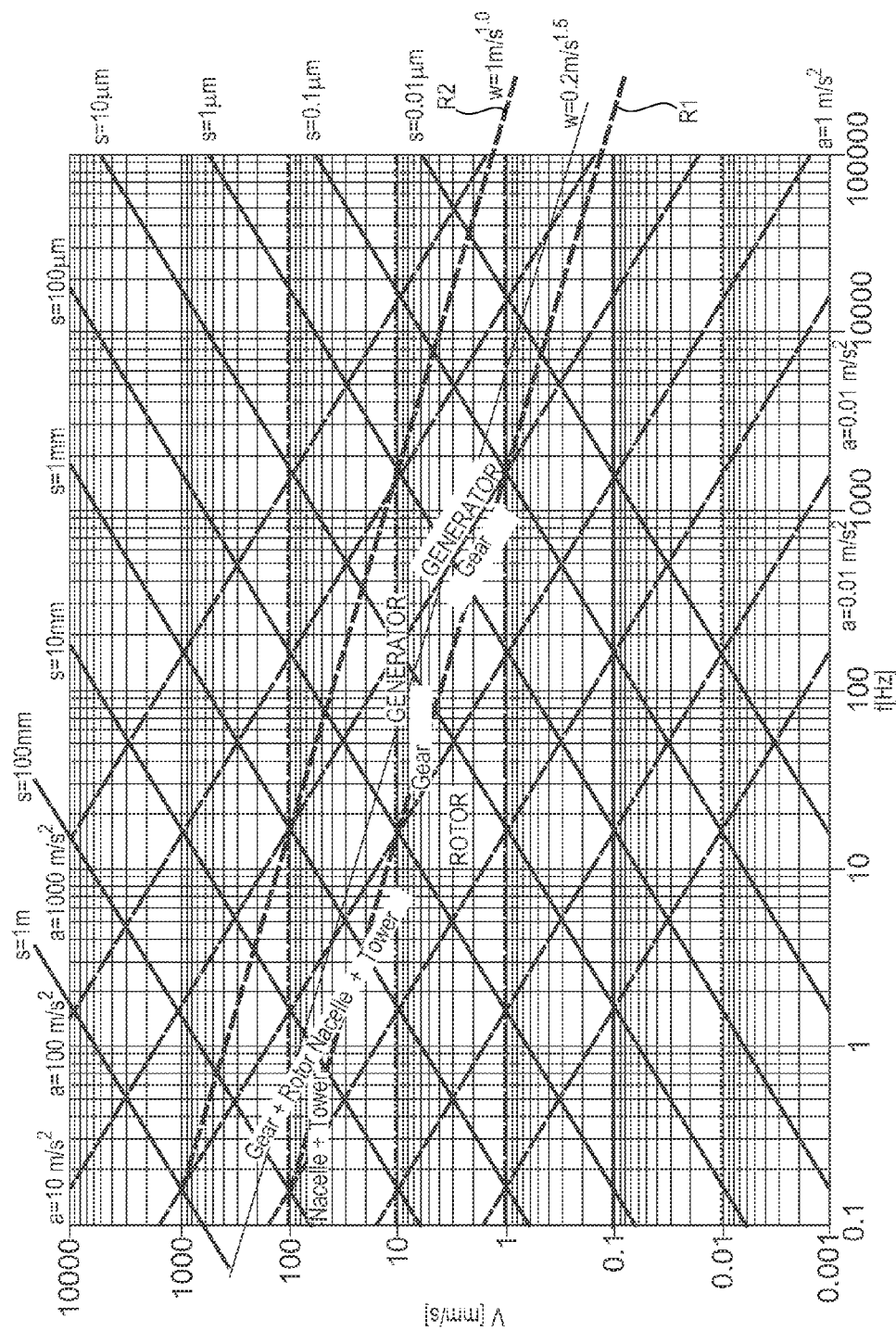
FIGS. 3A and 3B show exemplary embodiments of signal/frequency diagrams.

FIG. 3A shows an exemplary embodiment of a velocity/frequency diagram. In this case, the velocity signal V is plotted vs. the frequency f in a double-logarithmic scale. In wind turbines, usually reference values for velocity are given in mm/s and for acceleration in m/s² for different components such as nacelle, tower, rotor, roller bearing, gear and generator. Exemplary reference values of velocity for the warning are depicted as straight lines parallel to the frequency axis in predefined frequency ranges. Exemplary reference values of acceleration for the warning are depicted as falling straight lines with the slope −1 in the velocity/frequency diagram in the predefined frequency ranges. A step-shaped curve based on the series arrangement of the different reference values thus results in the velocity/frequency diagram. Curves for a constant site S correspond to rising straight lines with the slope +1. A constant value of the characteristic signal BK corresponds to a straight line in the velocity/frequency diagram with a slope between 0 and −1. Thus, rising straight lines represent the shift S, falling straight lines with smaller slope represent the characteristic signal BK and falling straight lines with greater slope represent the acceleration A. The characteristic signal BK lies with its slope between the horizontal straight line of a constant velocity signal V and the steeply falling straight line of a constant acceleration signal A.

Values for the alarm reference value R2 as well as for the warning reference value R1 are plotted in FIG. 3A. Exemplary values are R1=0.2 m/s$^{3/2}$ and R2=1 m/s$^{3/2}$. The decrease in the reference value with increasing frequency f means that a vibration occurring at a low frequency f has a smaller effect on the system than a vibration occurring at a higher frequency. If the vibration signal SG thus reflects a velocity V measured on the system, then the transfer function F(f) is selected such that signal components of the vibration signal SG at higher frequencies are weighted more strongly than those at low frequencies. Thus α has a value between 0 and 1.

The vibration limit values plotted in FIG. 3A have shocks and "corners" that cannot be explained physically by the actual load and the behavior of the system, but can be clarified by the provision of vibration sensors 11 and their measuring units as well as definitions for the reference values. The characteristic signal BK represents a measuring unit. The characteristic signal BK, also called a vibrancy signal, can be denoted as intermediate between the acceleration signal A and the velocity signal V. Preferably, the straight line of the constant characteristic signal BK has the slope −½ in the velocity/frequency diagram. In this case, the characteristic signal BK has the dimension of length/time$^{3/2}$ and units of m/s$^{3/2}$. The end of the run time RT is obtained for a system and a component as well as for its attachment, if the following applies:

$$SEAB = \int_{t=0}^{RT} B(f)^2 \cdot dt = KB = c^2;$$

wherein KB is the run time constant and c is the sound velocity of the principal material of the system. The alarm reference value can also be named the vibrancy limit value. The square of the vibrancy limit value multiplied by a run time of 20 years produces the value: 25*10⁶ m²/s². The root of this value is 5000 m/s and thus corresponds to the sound velocity c of steel, which is the principal material of a wind turbine.

Alternatively, the square SE and the RMS value of the characteristic signal BK can be calculated according to the following equation from the RMS value AEF of the acceleration signal A and the RMS value VEF of the velocity signal V:

$$SE = AEF \cdot VEF,\ BEF = \sqrt{AEF \cdot VEF},$$

The relation BK=SG*f$^{-1/2}$ can also be derived as follows: The following applies to sinusoidal vibration signals SG:

$$A = A_0 \sin(\omega t)$$

and $$V = \frac{A_0 \cos(\omega t)}{\omega},$$

$$A \cdot V = \frac{A_0^2 \sin(2\omega t)}{2\omega},$$

$$BK = w(\omega, t) = \sqrt{|A \cdot V|} = \frac{A_0 \sqrt{|\sin(2\omega t)|}}{\sqrt{2\omega}},$$

$$W(\omega) = \sum_{t=1}^{999} w\left(\omega, \frac{t \cdot 2 \cdot \pi}{998}\right),$$

wherein w is the time-dependent and frequency-dependent value of the characteristic signal BK, also called vibrancy, and W is the value of the vibrancy integrated over a period duration. Thus a ω$^{-1/2}$ relation is obtained from the root of the absolute value of A*V, and therefore an f$^{-1/2}$ relation, as it is shown in the diagram inserted in FIG. 3B. The RMS value BEF of the characteristic signal BK can thus also be produced by multiplication of the velocity signal V by the acceleration signal A and subsequently finding the RMS value, at least in the case of sinusoidal vibration signals SG.

The unit of the edgewise vibration is ew:=m/s$^{3/2}$. An edgewise vibration applied to vibrations is denoted vibrancy, indicated above as the characteristic signal BK. A limit value for the vibrancy BK for the warning can be, for example:

$$weff := 0.2 \cdot ew = 0.2\ m/s^{3/2}$$

A target run time RSO of a machine is:

$$RSO := 20\ \text{years} = 20 \cdot 365 \cdot 24 \cdot 3600 \cdot s$$

The sound velocity c of steel and aluminum are:

$$c = \sqrt{weff^2 \cdot RSO} = 5.02 \cdot 10^3 \frac{m}{s}$$

The sum ww of all vibrancy squares, also designated as total vibrancy or sum vibration is considerable and is indicated in FIG. 1C as SLF or SMF, for example:

$$SLF = ww = \sum_{Frequencies}\left[\sum_{Directions} weff^2\right] = 0.04 \frac{W}{kg}$$

Conversely, a sound limit time T, also called sonic wall time or service life results from the equation:

$$T = \frac{c^2}{ww} = 20 \text{ years}$$

If a machine has been running for RT=5 years with the limit value of the characteristic signal BK, then one-fourth of its target run time is consumed. A vibrancy integral Iww, also called vibration integral can be calculated employing:

$$Iww = \int_{0Years}^{RT} \frac{ww}{c^2} dt = 0.25$$

A remaining run time Rw consequently results therefrom as follows:

Rw=20 years·(1−Iww)=15 years

In the case of a vibrating mass of 200·t, a vibration power pw, also called vibraction power, results:

$$rw = \frac{ww \cdot \text{Mass}}{\text{Power}} = 0.27\%$$

In the case of a power converted by the machine of Power=3·10⁶ W, a vibration rate rw, also designated vibratio, follows therefrom:

pw=ww·Mass=8·kW

The square SE of the characteristic signal BK corresponds to a specific vibration power with the unit of W/kg.

Beginning with a time-dependent function SG(t) of the vibration signal, a Fourier transform can be performed for this function SG(t). This is possible under the conditions for the Fourier transform (square-integrable). By means of Fourier transform, one proceeds from the time domain to the frequency range. In the frequency range, a multiplication by iω corresponds to the differentiation according to time. In this case, i is the imaginary number and ω=2πf. The double differentiation corresponds to the multiplication by −ω². A multiplication in the Fourier space with ω^(2/3) corresponds to a half differentiation according to time. A generalized derivative exists in the context of Banach spaces. Hilbert spaces are special Banach spaces. Finally, Fourier spaces are special Hilbert spaces. The transfer function F(f) with the value of α=½ indicates that the characteristic signal BK is a half derivative of the vibration signal SG according to time.

Figure 3B:
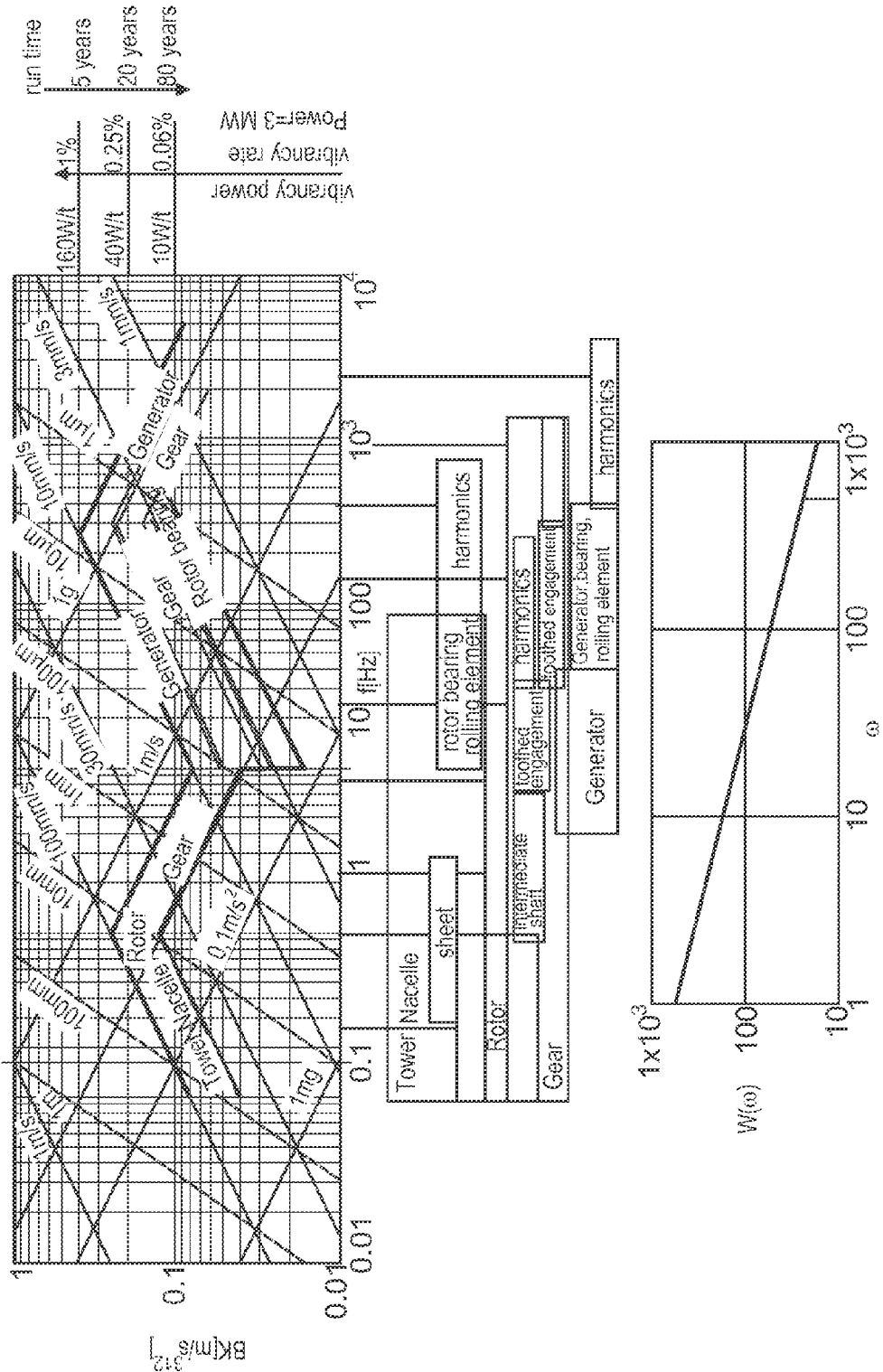

FIG. 3B shows an exemplary representation of the logarithmic value of the characteristic signal BK as a function of the logarithmic value of the frequency f. Exemplary reference values for both the warning and the alarm for the velocity and the acceleration are plotted in the diagram. The values for the velocity in this case result in rising straight lines with a slope of ½ and the values for the acceleration result in falling straight lines with a slope of −½. As a value for the exponent α, ½ is used. Further, an assignment of the measurement sites to the limit values as well as the respective frequency ranges of the components is given. A damage signature can be assigned to a measurement site and a component. The device for the evaluation of vibrations 10 can be used for monitoring the vibration of a system and thus for determining a current operating state of a system. The device for the evaluation of vibrations 10 can be used also for determining a run time of a system, as well as, e.g., a run time weighted by the load or the estimation of a remaining run time.

Alternatively, the vibration signal SG represents an acceleration that is measured on the system. In this case, an acceleration value has a greater effect on the system at a low frequency f than the same acceleration value at a high frequency f. The exponent a thus lies between −1 and 0. The transfer function F(f) weights the signal components at low frequencies in the vibration signal SG more strongly than the signal components at high frequencies. The characteristic signal BK is determined from the vibration signal SG by a fractional integration. In the case of the preferred value of the exponent α of −½, this corresponds to a half integration of the vibration signal SG.

The value measured by the vibration sensor 11 can be alternatively a site, a position, an offset or an angle. The angle can be taken at a rotating part of the system, such as a shaft, for example. The characteristic signal BK can be determined by means of the transfer function F(f) with a value for the exponent α between 1 and 2. In the case of the preferred value for the exponent α of 3/2, the characteristic signal BK thus corresponds to 3/2 times the time derivative of the vibration signal SG representing a site, a position, an offset or an angle. Thus, high frequencies are weighted more strongly than low frequencies.

It would be appreciated by those skilled in the art that various changes and modifications can be made to the illustrated embodiments without departing from the spirit of the present invention. All such modifications and changes are intended to be covered by the appended claims.

What is claimed is:

1. A device for the evaluation of vibrations, comprising:
a vibration sensor having an output configured to emit a vibration signal;
an evaluating device having an input connected to the output of the vibration sensor, the output configured for receiving the vibration signal, the evaluating device including:
a filter arrangement, having an input and an output, configured to provide, by a frequency-dependent evaluation of the vibration signal inputted from the output of the vibration sensor into the input of the filter arrangement, a characteristic signal with the dimension of length/time^β, through the output of the filter arrangement, and
a squaring device, having an input and an output, configured to receive the characteristic signal from the output of the filter arrangement and determine the square of the characteristic signal from the vibration signal to provide a square signal at the output of the squaring device,
wherein, for a predefined value of a dimensional exponent β, 1.3<β<1.7.

2. The device according to claim 1, wherein the characteristic signal is an intermediate between an acceleration and a velocity at the site of a vibration sensor outputting the vibration signal.

3. The device according to claim 1, wherein the characteristic signal has the dimension of length/time^(3/2).

4. The device according to claim 1, wherein the evaluating device is configured to provide the characteristic signal according to a transfer function as a function of the vibration signal, whereby the absolute value of the transfer function corresponds to the following equation:

$$|F(f)| = \left|\frac{BK}{SG}\right| = K \cdot f^\alpha,$$

wherein BK is the characteristic signal, SG is the vibration signal, f is a frequency, K is a predefined constant value, $\alpha$ is a predefined exponent value, F(f) is the transfer function and |F(f)| is the absolute value of the transfer function (F(f)).

5. The device according to claim 4, wherein the vibration signal is provided as an acceleration signal and the predefined value of the exponent $\alpha$ is from the range of $-0.7 < \alpha < -0.3$, or in which the vibration signal is provided as a velocity signal and the predefined value of the exponent $\alpha$ is from the range of $0.3 < \alpha < 0.7$, or in which the vibration signal is provided as a path, site or angle signal and the predefined value of the exponent $\alpha$ is from the range of $1.3 < \alpha < 1.7$.

6. The device according to claim 1, wherein the evaluating device is configured to compare an RMS value of the characteristic signal or the square of the characteristic signal with a predefined alarm reference value and to output an alarm signal if the RMS value of the characteristic signal or the square of the characteristic signal is larger than the predefined alarm reference value.

7. The device according to claim 1, wherein the evaluating device is configured to integrate over time or sum up the values for the square of the characteristic signal and, from the result, to provide an energy value signal, which corresponds to an effective elapsed operating run time.

8. The device according to claim 1, further comprising:
a display, which is coupled on the input side to the evaluating device, which is configured for determining a service life according to the following equation:

$$T = \frac{KB}{SE},$$

wherein T is the service life, KB is a run time constant and SE is the square of the characteristic signal, and the display is designed for displaying the service life.

9. The device according to claim 1, wherein the evaluating device is configured to calculate a vibration power by multiplication of the square of the characteristic signal by the mass of the machine whose vibrations are represented by the vibration signal.

10. The device according to claim 1, wherein the evaluating device is configured to decompose the vibration signal by means of Fourier transform into signal components occurring for different frequencies and to form the characteristic signal by a weighting of the signal components of the vibration signal occurring at the different frequencies.

11. The device according to claim 1, wherein the evaluating device includes an equalizer, which transforms the vibration signal into the characteristic signal.

12. A method for the evaluation of vibrations, comprising the steps of:
providing a vibration sensor, the vibration sensor configured to emit a vibration signal via an output upon sensing of vibrations;
providing a filter arrangement, having an input connected to the output of the vibration sensor and an output, the filter arrangement receiving the vibration signal via the input of the filter arrangement, filtering the vibration signal and sending a characteristic signal through the output of the filter arrangement;
providing a squaring device, having an input and an output, the squaring device configured to receive the characteristic signal from the filter arrangement via the input of the squaring device and sending a square signal through the output of the squaring device;
operating the filter arrangement to determine the characteristic signal, which has the dimension of length/time$^\beta$ with a dimensional exponent $\beta$ from a range of $1.3 < \beta < 1.7$, and
operating the squaring device to determine a square of the characteristic signal received from the output of the filter arrangement by a frequency-dependent evaluation of the vibration signal, which is outputted by the vibration sensor.

13. The method according to claim 12, further comprising the step of:
determining and displaying a service life according to the following equation:

$$T = \frac{KB}{SE},$$

wherein T is the service life KB is a run time constant and SE is the square of the characteristic signal.

14. The method according to claim 12, wherein the values for the square of the characteristic signal are integrated over time or summed up, and, from the result, an energy value signal is provided, which corresponds to an effective elapsed operating run time.

* * * * *